US012556481B1

(12) United States Patent
Holl et al.

(10) Patent No.: US 12,556,481 B1
(45) Date of Patent: Feb. 17, 2026

(54) TELEMETRY ASSISTED HYBRID LOAD BALANCING ON SWITCH FABRIC PATHS

(71) Applicant: Cisco Technology, Inc., San Jose, CA (US)

(72) Inventors: Steven Michael Holl, Sarasota, FL (US); Jason Adam Kuhne, Hopkinton, MA (US); Gonzalo Salgueiro, Raleigh, NC (US); Jason Michael Coleman, Hendersonville, NC (US)

(73) Assignee: Cisco Technology, Inc., San Jose, CA (US)

( * ) Notice: Subject to any disclaimer, the term of this patent is extended or adjusted under 35 U.S.C. 154(b) by 2 days.

(21) Appl. No.: 18/802,525

(22) Filed: Aug. 13, 2024

(51) Int. Cl.
*H04L 47/125* (2022.01)

(52) U.S. Cl.
CPC .................. *H04L 47/125* (2013.01)

(58) Field of Classification Search
None
See application file for complete search history.

(56) References Cited

U.S. PATENT DOCUMENTS

| 11,645,123 | B1 | 5/2023 | Ghafourifar | |
|---|---|---|---|---|
| 2019/0205170 | A1 | 7/2019 | Hushchyn | |
| 2019/0272461 | A1 | 9/2019 | Ravindranath | |
| 2020/0169513 | A1* | 5/2020 | Goel | H04L 47/41 |
| 2021/0119930 | A1* | 4/2021 | Debbage | H04L 1/1621 |
| 2023/0102063 | A1 | 3/2023 | Wong et al. | |
| 2023/0198895 | A1* | 6/2023 | Baniamerian | H04L 45/38 370/238 |

FOREIGN PATENT DOCUMENTS

WO   WO2024054227 A1   3/2024

OTHER PUBLICATIONS

Zeng et al., "Cutting Tail Latency in Commodity Datacenters with Cloudburst", May 2, 2022, IEEE, IEEE INFOCOM 2022—IEEE Conference on Computer Communications (2022, pp. 600-609) (Year: 2022).*
"Evolve your AI/ML Network with Cisco Silicon One," Cisco, May 8, 2024, retrieved at <<https://www.cisco.com/c/en/us/solutions/collateral/silicon-one/evolve-ai-ml-network-silicon-one.html>>, 24 pages.

* cited by examiner

*Primary Examiner* — Davoud A Zand
(74) *Attorney, Agent, or Firm* — Lee & Hayes, P.C.

(57) ABSTRACT

Techniques described herein can use a hybrid load balancing approach to balance loads on paths in a switch fabric. The switch fabric can deliver synchronization data between processors in a multi-processor cluster, and the synchronization data can load the paths on which it is sent. First paths can be identified in the switch fabric, and first synchronization data can be distributed to the first paths using a first load balancing approach, such as a telemetry assisted load balancing approach. Second paths can be identified in the switch fabric, and second synchronization data can be distributed to the second paths using a second load balancing approach, such as a packet spraying load balancing approach.

20 Claims, 8 Drawing Sheets

TELEMETRY ASSISTED HYBRID LOAD BALANCING ON SWITCH FABRIC PATHS

TECHNICAL FIELD

The present disclosure relates generally to multiprocessor computing systems, and to the use of switching fabrics to synchronize operations of multiple processors in particular.

BACKGROUND

Web scale networks are undergoing a transformation to deal with the rise of large processing workloads. Example large workloads include Artificial Intelligence (AI) and Machine Learning (ML) model training workloads. Workload distribution and processing approaches used in the past no longer suffice for today's challenges, in part because AI/ML training workloads present a paradigm shift and new network requirements.

Today's workloads can benefit from scalable and sustainable back-end networks that facilitate inter-processor communications. Fully scheduled fabrics provide ultimate non-blocking performance but have a narrow ecosystem. Today, all-to-all collective approaches may be used to process AI/ML workloads. All graphics processing units (GPUs) within a job communicate with all other GPUs to synchronize their tasks.

Communication can take various paths across a data center network, due to path redundancy. Path redundancy can reduce failures and/or allow for increased bandwidth beyond what a single network link can provide. Various network fabric load balancing methods may be used to select processing paths through the network for maximum performance. AI/ML jobs tend to create larger workloads than web traffic, but due to AI/ML jobs being much larger and bursty, they present new problems for back-end networks to solve.

For example, congestion can cause delays in synchronization during barrier operations, and this can impact job completion time (JCT). In cases such as this, computation may stall to wait for the slowest GPU and/or the slowest path, based on the worst-case tail latency. As a result, AI/ML job processing may be performance-bound by GPU messaging and/or by the network path with the longest tail latency.

Although various network load balancing mechanisms are employed to support GPU communication to participate in the all-to-all collective, what is needed are new load balancing approaches which address the causes of tail latency from both the network and GPU perspective, its infrastructure dependencies as well as network path considerations. In addition to applications for GPU communication, these concepts may apply to all large computational workloads that are distributed across processing units, such as high performance computing workloads calculated by central processing units (CPUs) or data processing units (DPUs).

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DESCRIPTION OF EXAMPLE EMBODIMENTS

Overview

Figure 1:
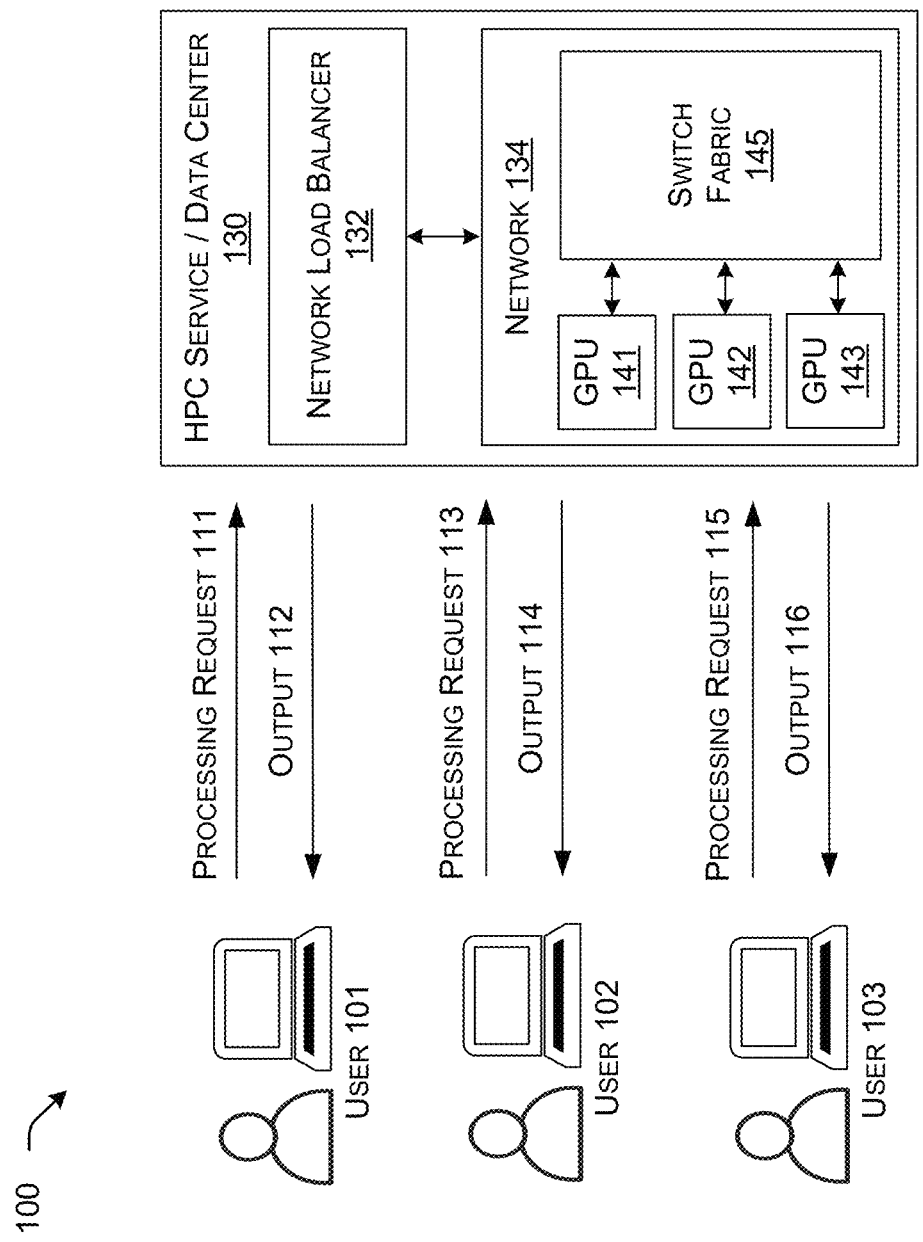
FIG. 1 illustrates an example architecture comprising users who direct processing requests at a high performance computing (HPC) service or data center which is equipped with a cluster of processors, in accordance with various aspects of the technologies disclosed herein.

This disclosure describes techniques that can be performed in connection with hybrid load balancing across fabric paths. Example techniques can be deployed in the context of a switch fabric comprising multiple switches, which enables communication of synchronization data between multiple processors. Example techniques can include identifying a first path through the switch fabric and identifying two or more additional paths through the switch fabric. Each of the paths can comprise a respective different switch usage sequence of multiple switches included in the switch fabric. Example techniques can send first synchronization data via the first path and according to a telemetry assisted load balancing technique and can send second synchronization data via the two or more additional paths. Sending the second synchronization data can be distributed among the two or more additional paths according to a packet spraying load balancing technique.

The techniques described herein may be performed by one or more computing devices comprising one or more processors and one or more computer-readable media storing computer-executable instructions that, when executed by the one or more processors, cause the one or more processors to perform the methods disclosed herein. The techniques described herein may also be accomplished using non-transitory computer-readable media storing computer-executable instructions that, when executed by one or more processors, perform the methods carried out by the network controller device.

Example Embodiments

In an example according to this disclosure, a hybrid load balancing approach can be used to balance loads on paths in a switch fabric. The switch fabric can deliver synchronization data between processors in a multi-processor cluster, and the synchronization data can load the paths on which it is sent. First paths can be identified in the switch fabric, and first synchronization data can be distributed to the first paths using a first load balancing approach, such as a telemetry assisted load balancing approach. Furthermore, second paths can be identified in the switch fabric, and second synchronization data can be distributed to the second paths using a second load balancing approach, such as a packet spraying load balancing approach.

Example multi-processor clusters connected via a switch fabric can comprise GPU clusters, and example workloads processed by GPU clusters can comprise AI/ML model training workloads. Consider a scenario in which GPUs in a cluster of multiple GPUs cooperate to process workloads directed at the cluster. The GPUs can be connected via a switch fabric comprising multiple switches, such that there are multiple different paths through the switch fabric, with each path comprising a different switch usage sequence. First synchronization data may synchronized between GPUs via a first path, second synchronization data may synchronized between GPUs via a second path, and so on. In some cases, synchronization data may synchronized between GPUs via multiple paths, with one or more first portions of synchronization data being directed to a first path and one or more second portions of the synchronization data being directed via a second path.

In such scenarios wherein synchronization data can be sent via different paths through a switch fabric, various different load balancing techniques can be applied. A first example load balancing technique is referred to as equal cost multi pathing (ECMP). For ECMP, costs are assigned different synchronization tasks, and synchronization tasks are distributed so that costs are equally distributed among paths.

A second example load balancing technique is referred to as telemetry assisted load balancing. In telemetry assisted load balancing, also referred to herein as weighted load balancing, observations or tests are made to assess performance of different paths, and then paths are assigned weights. The weights are used to steer synchronization task assignments with unequal load-balancing, with incoming synchronization tasks, or larger portions of incoming tasks, being assigned to less congested paths, while smaller portions of incoming synchronization tasks can optionally be assigned to more congested paths.

A third example load balancing technique is referred to as fully scheduled fabric. Fully scheduled fabric may also be referred to herein as packet spraying. In a fully scheduled fabric, workload packets of a given synchronization task are split up into many fragments and sent sequentially over multiple paths, so that the given synchronization task is distributed in a manner that evenly loads all of the multiple paths.

Embodiments of this disclosure can apply a hybrid load balancing approach, which can be, for example, a combination of ECMP and packet spraying, or a combination of telemetry assisted load balancing and packet spraying. Similar to telemetry assisted load balancing, observations or tests can be made to assess performance of different paths. However, instead of using the telemetry assisted measurements to assign synchronization tasks among all paths, the telemetry assisted measurements can be used to select one or more first paths, thereby differentiating the first paths from remaining second/additional paths. A first load balancing approach, e.g., telemetry assisted load balancing, can be used to assign some synchronization tasks among the one or more first paths. A second load balancing approach, e.g., packet spraying, can be used to assign other synchronization tasks among the second paths.

In some examples, the first paths can comprise the highest performing/least congested paths, and the first synchronization tasks assigned to the first paths can be the highest priority synchronization tasks. The remaining, lower priority synchronization tasks can be distributed among the lower performing/more congested paths according to the packet spraying technique.

Furthermore, the number or percentage of paths selected for use as first paths can be dynamic in some implementations. The number or percentage can be adjusted based on relative performance of the first paths compared to the second paths, the number of high priority synchronization tasks, and/or other measurements as desired for particular implementations.

Examples of this disclosure can implement a novel approach for switch fabric traffic balancing, to balance synchronization traffic through a switch fabric that connects GPUs in a GPU cluster. Switch fabrics and the GPUs that use the switch fabrics may also be referred to herein as backend networks. Example implementations can deploy a dynamic hybrid load balancing technique in which packet spraying and telemetry-assisted path weighting can co-exist to thereby offer benefits of both load balancing types.

In one aspect, transactions and telemetry can be used to identify congestion of switch fabric paths. The resulting measurements can support load balancing in a hybrid fashion, in which a portion of paths operate in packet spraying mode, and other links/paths are load balanced using a weighted path technique, such as telemetry assisted load balancing. Implementations can thereby support a class of service or weighted priority for selected important processing jobs (also referred to herein as synchronization tasks) by optimizing those important processing jobs for fast processing via weighted path load balancing, while also avoiding the need for packet reassembly. Meanwhile, implementations can offer packet spraying for the rest of the available paths, thereby providing the optimization that spraying offers for congestion avoidance and link utilization, e.g., an up to 1.9× efficiency gain in at least some circumstances.

In some examples, packet spraying can be accomplished through the use of hardware that is configured therefor, such as "SILICONE ONE" type hardware made by CISCO®. Hardware that is adapted for packet spraying can optionally be configured with supplemental components and functions to enable the additional features described herein.

Generally, in a fabric, if there is congestion, barrier operations may cause computation to stall and wait for a slowest path, based on a worst-case tail latency. As a result, AI/ML jobs can be bound by a slowest GPU or path. There are three load balancing approaches to address this problem, introduced above. These are ECMP, telemetry assisted load balancing, and packet spraying. Although embodiments of this disclosure can optionally combine ECMP and packet spraying, ECMP often does not perform well for large and bursty traffic needs, and so this disclosure focuses on combinations of telemetry assisted load balancing and packet spraying.

While packet spraying to evenly split packets across all link opportunities is effective, it results in out-of-order packets and therefore involves reassembly at the receiving end. Reassembly can be a costly endeavor. Furthermore, packet spraying treats every small packet equally, so it is not well adapted to provide preference of traffic for selected priority jobs over others.

In addition to the packet reassembly costs, packet spraying may not be the most effective approach for some desired business outcomes. For example, packet spraying may not be the most effective approach when an inter-data center (or building cross-connect) with higher latency or lower throughput is used to connect across a GPU fabric. Furthermore, packet spraying may not be the most effective approach when there are some participating switches in a fabric that are not capable of packet spraying, in which case a hybrid approach such as described herein can allow for partial spraying in the cluster. Packet spraying also may not be the most effective approach in the absence of congestion or multiple jobs to process, or when small and bursty jobs are to be processed.

Implementations of this disclosure can address the above challenges, by allowing for a hybrid system comprising both a weighted path system for workload checkpointing, as well as the ability to spray packets in a hybrid manner when there is an advantage in doing so. Examples can make use of telemetry measurements that are always on to measure performance across a backend fabric in near real time. Furthermore, examples can be configured to respond to telemetry measurements and adapt the response on how the inter-GPU communication paths are selected, influencing path weights upon tests identifying congestion. Examples can also influence which paths allow weighted pathing versus packet spraying, based on telemetry observations and class of service needs. In some examples, a controller can support designating a class of service for a workload, in order to specify a weighted load balancing path or paths for checkpointing the workload, instead of allowing the synchronization data associated with the workload to be packet sprayed.

With regard to transactions and telemetry for weighted path decisions, small micro-synthetic transactions can be run across a back-end fabric, to constantly measure instantaneous performance of back-end network paths. Frequent but small transactions allow for measuring congestion even when there are the large workloads across a path.

The transactions can optionally be performed from embedded agents in an in-band switch fabric, on devices closest to the GPUs performing a workload. Synthetic tests can be sent out to all other fabric egresses that are representative of the other GPUs that are receiving and processing synchronization data. The tests can be full mesh tests, though if there are multiple GPUs on a same ingress/egress switch adjacent to a server, then the agent can be shared for representing those devices.

Transactions can expect a round trip response, much like an internet control message protocol (ICMP) ping. If there is a transaction and it is pending a response or the last response was significantly slower than results for baseline operation, then it allows the fabric to understand that there is path congestion, and it can weight that path accordingly.

Transaction packets can be small enough to not materially impact bandwidth of a link, yet able to obtain real in-band path performance measurements by getting jammed up behind large sized workloads for synchronization that are sent across the fabric in high performance computing (HPC) or AI/ML model training workload processing. These micro-transactions are sent at high frequency, to allow for near-real time testing even during large workload processing, to identify and report congestion so that load balancing can be adjusted to respond to that congestion.

When congestion is observed using the transactions and telemetry approaches described above, systems and methods according to this disclosure can, first, weight the link on which the congestion is observed, such that a different path is more likely to be selected when synchronizing a next workload task. Next synchronization tasks can then be steered in their entirety across whichever links have weightings that reflect relatively higher, or highest throughput at the time of link selection.

Second, systems and methods according to this disclosure can choose to spray packets across a portion of links. An administrator can optionally define a quantity or percentage of paths that should remain as weighted paths for priority tasks, for which packet reassembly is not desired, leaving the rest of the paths to operate in packet spraying mode. AI or ML may also optionally be applied to determine the quantity or percentage of links used for spraying versus weighted paths, to allow for historical intelligence to learn the optimal balance for workload throughput needs.

Some implementations can define a class of service for workloads directed to weighted paths (which can be load balanced using weighted path load balancing), and another class of service for workloads that are directed to packet spraying distribution. In an example implementation, at the application layer, a class of service tag can be set on a GPU workload. The class of service tag can signify if there is a preference for the workload to be processed by packet spraying, weighted path selection, or in an agnostic/combination mode wherein a workload can be processed using either or both load balancing techniques. The use of class of service tags enables administrator selection of whether certain workloads can be packet sprayed or not. This avoids filling up a full fabric with weighted paths and potentially causing unwanted congestion by sending all synchronization data down weighted paths. It also but also enables control of when packet spraying is performed, thereby allowing avoidance of slow packet reassembly tasks at the receiving side.

Additionally, some examples can support paths that can co-exist and perform both packet spraying and weighted paths, where a same path between an ingress and egress port is both spraying and reassembling packets, as well as steering weighted traffic. Furthermore, additional telemetry can optionally be extracted from the synthetic transactions, to provide per-layer two hop statistics, and provide insight and optimized behavior on the middle-layer path performance. Some implementations can be configured with an ability to spray across a weighted path, to prevent further congestion to sprayed packets that may occur in observed areas.

In summary, implementations of this disclosure offer a solution for Ethernet to be more intelligent in how traffic across a back-end fabric for GPU and HPC workload synchronization occurs. Current approaches are stateful (flowlet) and packet spraying for Ethernet applications, but packet spraying alone offers a significant cost of packet reassembly at the receiving side and introduces delay when trying to solve the problem of avoiding link congestion. This disclosure therefore offers telemetry assisted transactions to measure congestion and weight fabric paths accordingly, as well as hybrid packet spraying across a portion of the set of paths as a way to optimize overall throughput for selected workloads where one approach for fully path weighting or fully packet spraying may result in suboptimal performance for the bulk of tasks or at least the higher priority tasks.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates an example architecture 100 comprising users 102, 102, 103 who direct processing requests 111, 113, 115 at a high performance computing (HPC) service or data center 130, in accordance with various aspects of the technologies disclosed herein. The HPC service or data center 130 can perform processing jobs according to the processing requests 111, 113, 115. For example, when the processing requests 111, 113, 115 are requests to train AI/ML models, the HPC service or data center 130 can perform AI/ML model training as requested. After completing processing jobs according to the processing requests 111, 113, 115, the HPC service or data center 130 can optionally return respective outputs 112, 114, 116 to the users 101, 102, 103. The respective outputs 112, 114, 116 can comprise, e.g., respective trained AI/ML models, or any other HPC outputs depending upon the nature of the processing requests 111, 113, 115.

The HPC service or data center 130 can be equipped with a network load balancer 132 and a network 134. The network 134 may be referred to as a back end network and can comprise a cluster of connected processors such as the GPUs 141, 142, 143 and a switch fabric 145. The illustrated example includes GPUs which may be replaced by CPUs or DPUs in other examples. The GPUs 141, 142, 143 can cooperate by exchanging synchronization data through the switch fabric 145. The network load balancer 132 can be configured as described herein to balance loads on communication paths through the switch fabric 145, determining what links should use weighted load balancing, and what links should be packet sprayed.

In some embodiments, the switch fabric 145 can support a Clos type leaf/spine physical architecture topology. In other embodiments, the switch fabric 145 can comprise an overlay network such as VXLAN which also supports multi-path communications. Telemetry traffic over Ethernet can be encapsulated into VXLAN and be subject to the resulting behavior of the overlay.

In an example, processing requests 111, 113, 115 can comprise large workloads, which can optionally be separated into smaller subparts. The workload subparts can be distributed among the GPUs 141, 142, 143, and each time a GPU completes processing of a subpart, it may report its results, in the form or synchronization data, to all of the other GPUs 141, 142, 143. Such reporting of results to all of the other GPUs 141, 142, 143 is referred to herein as an all-to-all collective approach.

The network load balancer 132 can be configured as described herein to balance loads on communication paths through the switch fabric 145, e.g., by either instructing a GPU 141, 142, 143 to report synchronization data via one or more designated paths through the switch fabric 145, or by configuring/controlling the switch fabric 145 itself in a manner that causes the switch fabric 145 to direct synchronization data output from a GPU via one or more designated paths through the switch fabric 145.

Figure 2:
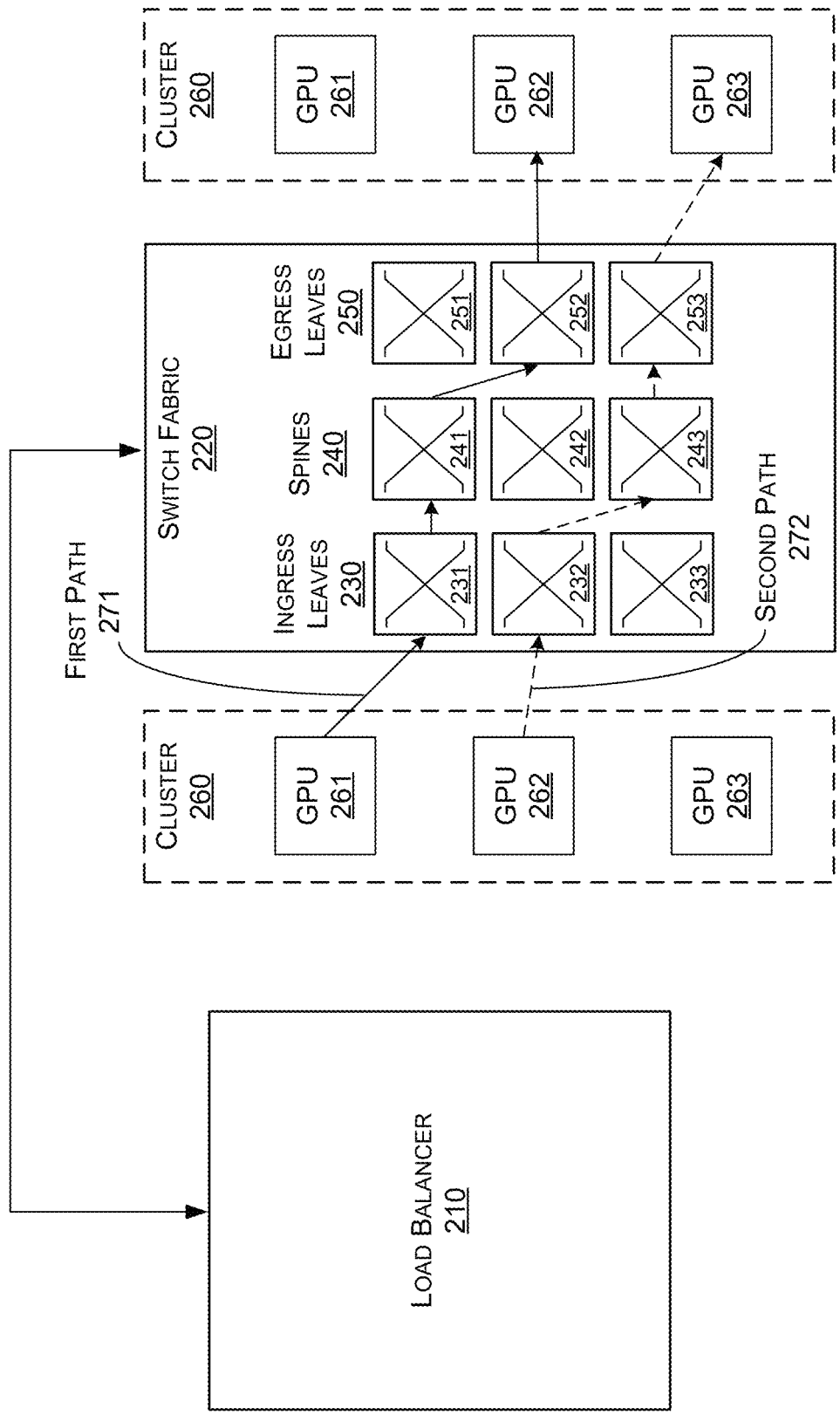
FIG. 2 illustrates an example switch fabric that can enable communications between multiple graphics processing units (GPUs) in a cluster of processors, wherein a load balancer can configure traffic on paths through the switch fabric, in accordance with various aspects of the technologies disclosed herein.

FIG. 2 illustrates an example switch fabric 220 that can enable communications between multiple graphics processing units (GPUs) 261, 262, 263 in a cluster 260, wherein a load balancer 210 can configure traffic on paths through the switch fabric 220, in accordance with various aspects of the technologies disclosed herein. The switch fabric 220 can implement the switch fabric 145 introduced in FIG. 1, the GPUs 261, 262, 263 can implement the GPUs 141, 142, 143 introduced in FIG. 1, and the load balancer 210 can implement the network load balancer 132 introduced in FIG. 1, in some implementations.

The switch fabric 220 comprises example ingress leaves 230, example spines 240, and example egress leaves 250. The ingress leaves 230 include example ingress leaves 231, 232, and 233, and can include more or fewer ingress leaves in some embodiments. The spines 240 include example spines 241, 242, and 243, and can include more or fewer spines in some embodiments. The egress leaves 250 include example egress leaves 251, 252, and 253, and can include more or fewer egress leaves in some embodiments. The ingress leaves 230, spines 240, and egress leaves 250 can be implemented by switches or other computing devices or entities capable or routing data through the switch fabric 220.

Paths through the switch fabric 220 can generally enter the switch fabric 220 at any ingress leaf, traverse through any spine, and exit through any egress leaf. A few example paths are illustrated in FIG. 1, understanding that multiple other paths are also available. A first path 271 enters the switch fabric 220 from GPU 261 at ingress leaf 231, then traverses to spine 241, then traverses to egress leaf 252, and finally exits the switch fabric 220 to GPU 262. A second path 272 enters the switch fabric 220 from GPU 262 at ingress leaf 232, then traverses to spine 243, then traverses to egress leaf 253, and finally exits the switch fabric 220 to GPU 263. Note that the GPUs 261, 262, 263 are illustrated redundantly in FIG. 1 for the purpose of illustrating ingress and egress from the switch fabric 220. The dotted line around cluster 260 signifies that the GPUs 261, 262, 263 are same GPUs illustrated in different locations for ease of illustration. Also, while the example first path 271 and second path 272 are illustrated as from one single GPU to another one single GPU, some paths may be from one single GPU to many GPUs, e.g., to all other GPUs. Such one-to-many paths can be similar to the paths illustrated in FIG. 2 but can exit the switch fabric 220 to all other GPUs.

In accordance with FIG. 2, when a GPU such as GPU 261 completes a task, it can send synchronization data to all other GPUs. The GPU 261 can send the synchronization data via one or more paths through the switch fabric 220. In some embodiments, the GPU 261 can configure synchronization data into packets which can be sent by either a same path or by different paths through the switch fabric 220, and if needed the packets can be reassembled after traversing the switch fabric 220.

The load balancer 210 is illustrated as exchanging measurements and configuration data 273 with the switch fabric 220. Measurement data can be gathered from the switch fabric 220, and the measurement data can be used to determine paths for synchronization data. The resulting path determinations can be sent from the load balancer 210 to the switch fabric 220 as configuration data, which configures the paths through the switch fabric 220 to be used by each of the different GPUs 261, 262, 263 when reporting synchronization data to the other GPUs.

Figure 3:
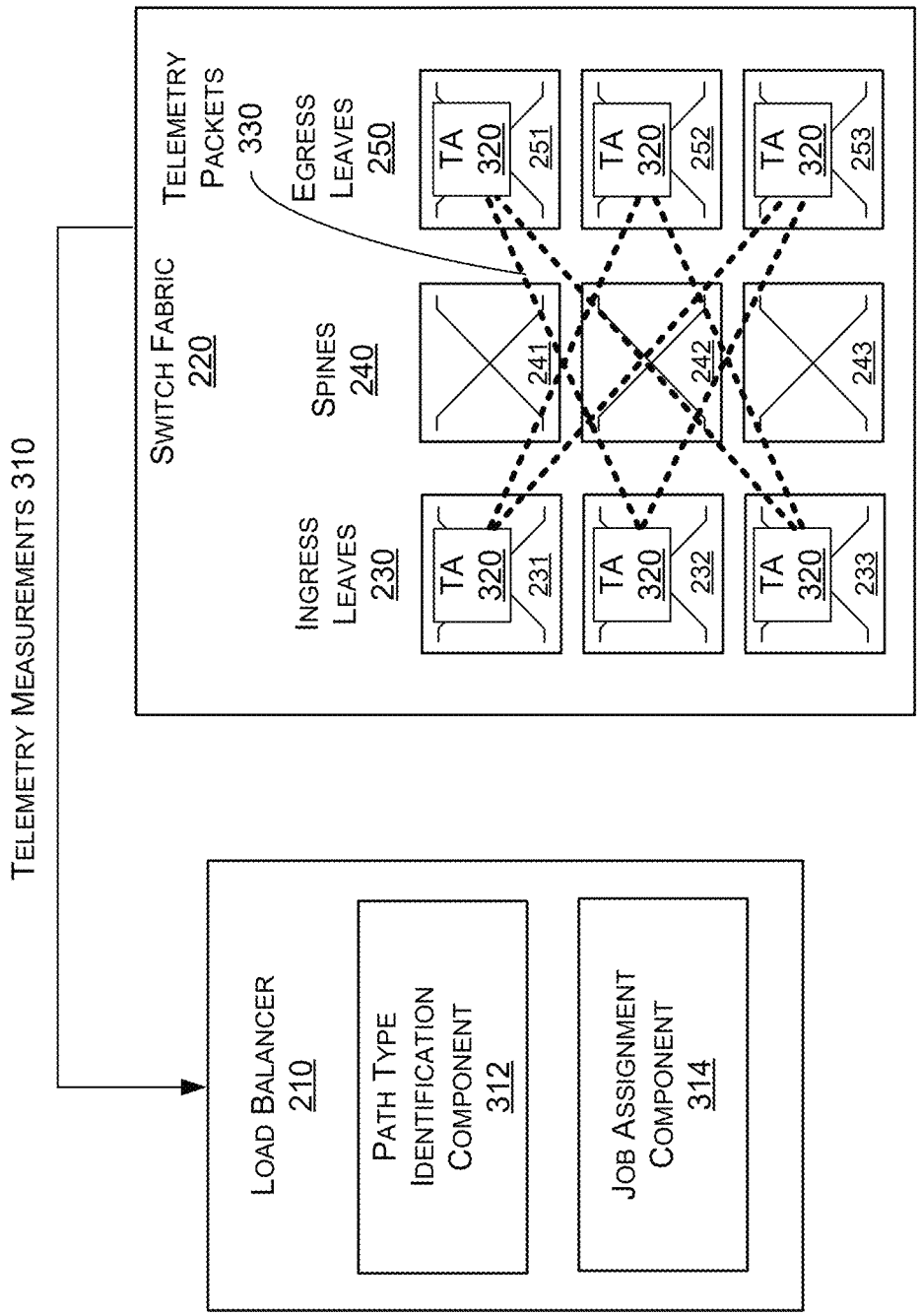
FIG. 3 illustrates example components of the load balancer introduced in FIG. 2, as well as telemetry agents in the switch fabric which can gather telemetry measurements for use by the load balancer, in accordance with various aspects of the technologies disclosed herein.

FIG. 3 illustrates example components of the load balancer 210 introduced in FIG. 2, as well as telemetry agents 320 in the switch fabric 220 which can gather telemetry measurements 310 for use by the load balancer 210, in accordance with various aspects of the technologies disclosed herein. In the illustrated example configuration, the components of the load balancer 210 can include a path type identification component 312 and a job assignment component 314.

The path type identification component 312 can be configured to use the telemetry measurements 310 to determine "first" paths through the switch fabric 220, which can be used in connection with to a first load balancing method, and "second" paths through the switch fabric 220, which can be used in connection with a second load balancing method. Furthermore, the path type identification component 312 can be configured to determine a number or percentage of paths to be designated as first paths, and a number or percentage of remaining paths to be designated as second paths.

The telemetry agents 320 can be configured to gather the telemetry measurements 310 and report the telemetry measurements 310 to the load balancer 210. In one example, the telemetry agents 320 can each send telemetry packets 330 via each available path link and can gather resulting packet travel times. For example, a telemetry agent at ingress leaf 231 can send telemetry packets 330 to a telemetry agent at egress leaf 252 and to a telemetry agent at egress leaf 253. A telemetry agent at ingress leaf 232 can send telemetry packets 330 to a telemetry agent at egress leaf 251 and to a telemetry agent at egress leaf 253. A telemetry agent at ingress leaf 233 can send telemetry packets 330 to a telemetry agent at egress leaf 251 and to a telemetry agent at egress leaf 252. Telemetry agents at each of the egress leaves 251, 252, 253 can receive the telemetry packets 330 and can either process travel speeds locally, or report the packet send and receive times as telemetry measurements 310, allowing the load balancer 210 to calculate travel speeds.

In general, paths with better measurements (such as faster speed, higher throughput, etc.) can be identified by path type identification component 312 as first paths and can be load balanced according to a first load balancing technique, e.g., using a telemetry assisted load balancing approach, in which higher priority synchronization data is assigned to faster measured paths. In some cases, a first path among the first paths can be dedicated to one GPU at a time to handle transport of all synchronization data output from the applicable GPU. In other cases, different first paths can handle different percentages of synchronization data output from each of several different GPUs. For example, communication for GPU1: GP2 can use 30% of one first path's bandwidth, and the other 70% of bandwidth can be used for other communications.

Meanwhile, paths with worse measurements such as slower measured speeds or lower throughputs can be identified by path type identification component 312 as second paths, which can be used in connection with a second load balancing approach, e.g., a packet spraying type load balancing approach in which synchronization data is separated into packets, sent via multiple different second paths, and then reassembled after exit from the switch fabric 220. Using paths with better measurements as first paths and paths with worse measurements as second paths is one example, and such a configuration choice can be customized as desired by administrators of particular implementations. For example, the roles of different paths can optionally be reversed based on desires of the administrator for what types of workloads should employ first paths vs. second paths.

The path type identification component 312 can optionally be configured to determine a percentage of first paths and a corresponding percentage of second paths. The determination can optionally be based on, e.g., a machine learning optimization to ascertain an optimal division of first and second paths for overall performance of the switch fabric 220.

Path type identifications made by the path type identification component 312 can be passed to the job assignment component 314. The job assignment component 314 can be responsible for assigning different synchronization data to different paths. For example, the job assignment component 314 can assign synchronization data output from each of one or more first GPUs to each of one or more first paths, on a one to one basis. The job assignment component 314 can assign synchronization data output from each of one or more second GPUs to be packet sprayed across two or more second paths.

Figure 4:
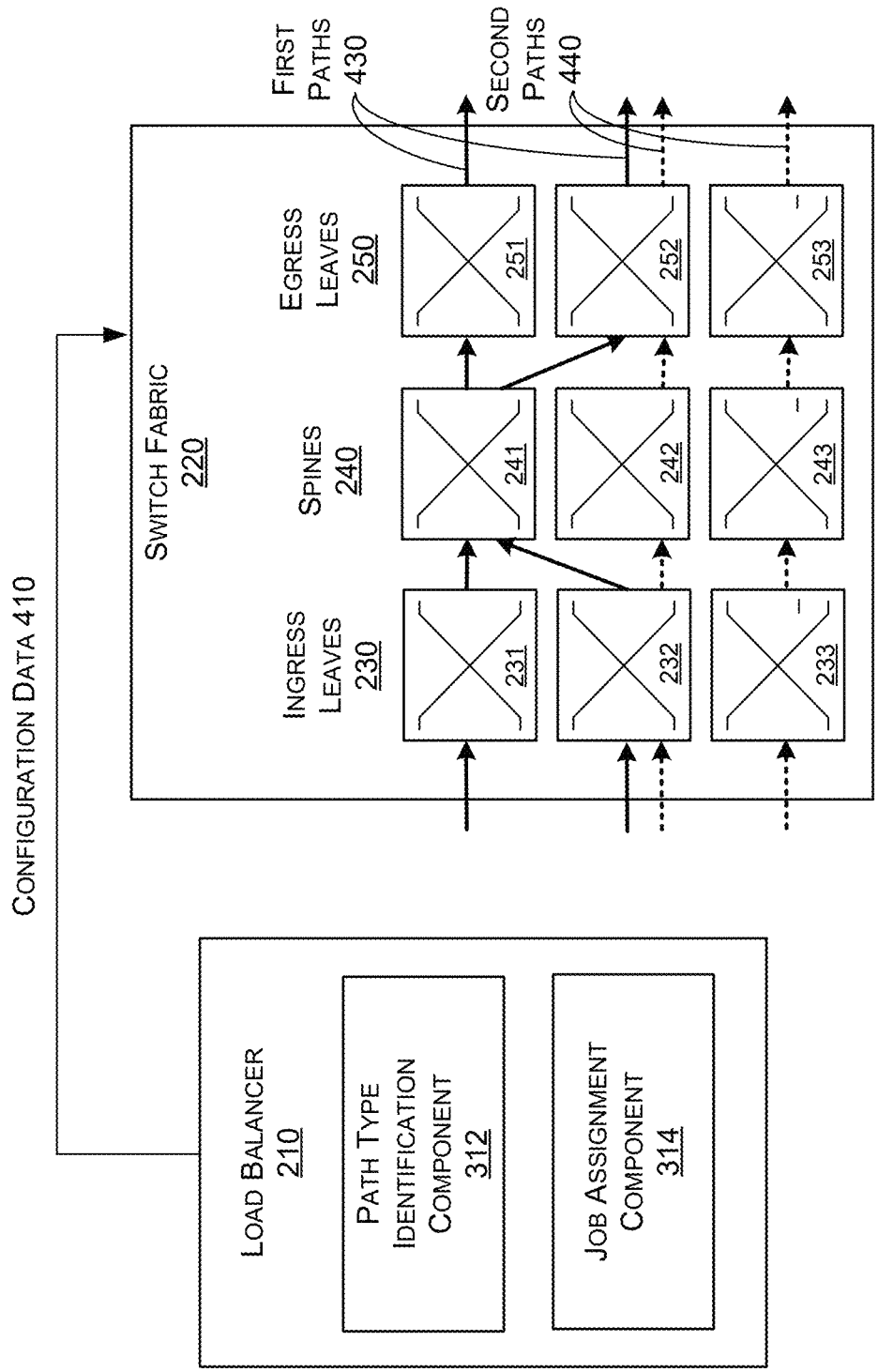
FIG. 4 illustrates example first paths through the switch fabric, wherein the first paths can be used in connection with a first load balancing method, and example second paths through the switch fabric, wherein the second paths can be used in connection with a second load balancing method, in accordance with various aspects of the technologies disclosed herein.

FIG. 4 illustrates example first paths 430 through the switch fabric 220, wherein the first paths 430 can be used in connection with a first load balancing method, and example second paths 440 through the switch fabric 220, wherein the second paths 440 can be used in connection with a second load balancing method, in accordance with various aspects of the technologies disclosed herein. FIG. 4 includes the switch fabric 220 and the load balancer 210 introduced in FIG. 2, as well as the path type identification component 312 and the job assignment component 314 introduced in FIG. 3.

The first paths 430 include an example path that begins at ingress leaf 231, proceeds to spine 241, and proceeds to egress leaf 251. The first paths 430 further include another example path that begins at ingress leaf 232, proceeds to spine 241, and proceeds to egress leaf 252. The illustrated first paths 430 are examples and first paths 430 can optionally comprise more paths, fewer paths, or different paths through the switch fabric 220.

The second paths 440 include an example path that begins at ingress leaf 232, proceeds to spine 242, and proceeds to egress leaf 252. The second paths 440 further include another example path that begins at ingress leaf 233, proceeds to spine 243, and proceeds to egress leaf 253. The illustrated second paths 440 are examples and second paths can optionally comprise more paths, fewer paths, or different paths through the switch fabric 220.

The number of first paths 430, as well as the routes of the first paths 430 through the switch fabric 220, can be determined by the path type identification component 312 based on telemetry measurements 310 as described with reference to FIG. 3, or can be manually set by an administrator, e.g., as a selected percentage of the overall quantity of available paths. Similarly, the number of second paths 440, as well as the routes of the second paths 440 through the switch fabric 220, can be determined by the path type identification component 312 based on telemetry measurements 310 as described with reference to FIG. 3, or can be determined based on a percentage selected by an administrator. In some embodiments, the paths with faster measured speeds or lower congestion can be identified by path type identification component 312 as first paths 430, and paths with slower measured speeds can be identified by path type identification component 312 as second paths 440. The path type identification component 312 can optionally reconfigure paths dynamically, based on updated telemetry measurements 310, resulting in different first paths 430 and second paths 440.

The job assignment component 314 can be responsible for assigning different synchronization data transport jobs to different paths. For example, when the first paths 430 are used in connection with a telemetry assisted load balancing approach, the job assignment component 314 can assign synchronization data output from each of one or more first GPUs to each of the one or more first paths 430, optionally on a one to one basis. Meanwhile, when the second paths 440 are load balanced according to a packet spraying type (evenly load balanced) approach, the job assignment component 314 can assign synchronization data output from one or more second GPUs to the second paths 440, so that the synchronization data can be packet sprayed across some or all of the second paths 440.

The load balancer 210 is illustrated as providing configuration data 410 to the switch fabric 220. The configuration data 410 can configure the switch fabric 220 to transport synchronization data output from a specified GPU along a specified path. The configuration data 410 can thereby implement the synchronization data job assignments generated by the job assignment component 314. Alternatively, the load balancer 210 can provide configuration data 410 to GPUs directly, and the GPUs can specify paths through the switch fabric 220 for their synchronization data outputs.

Figure 5:
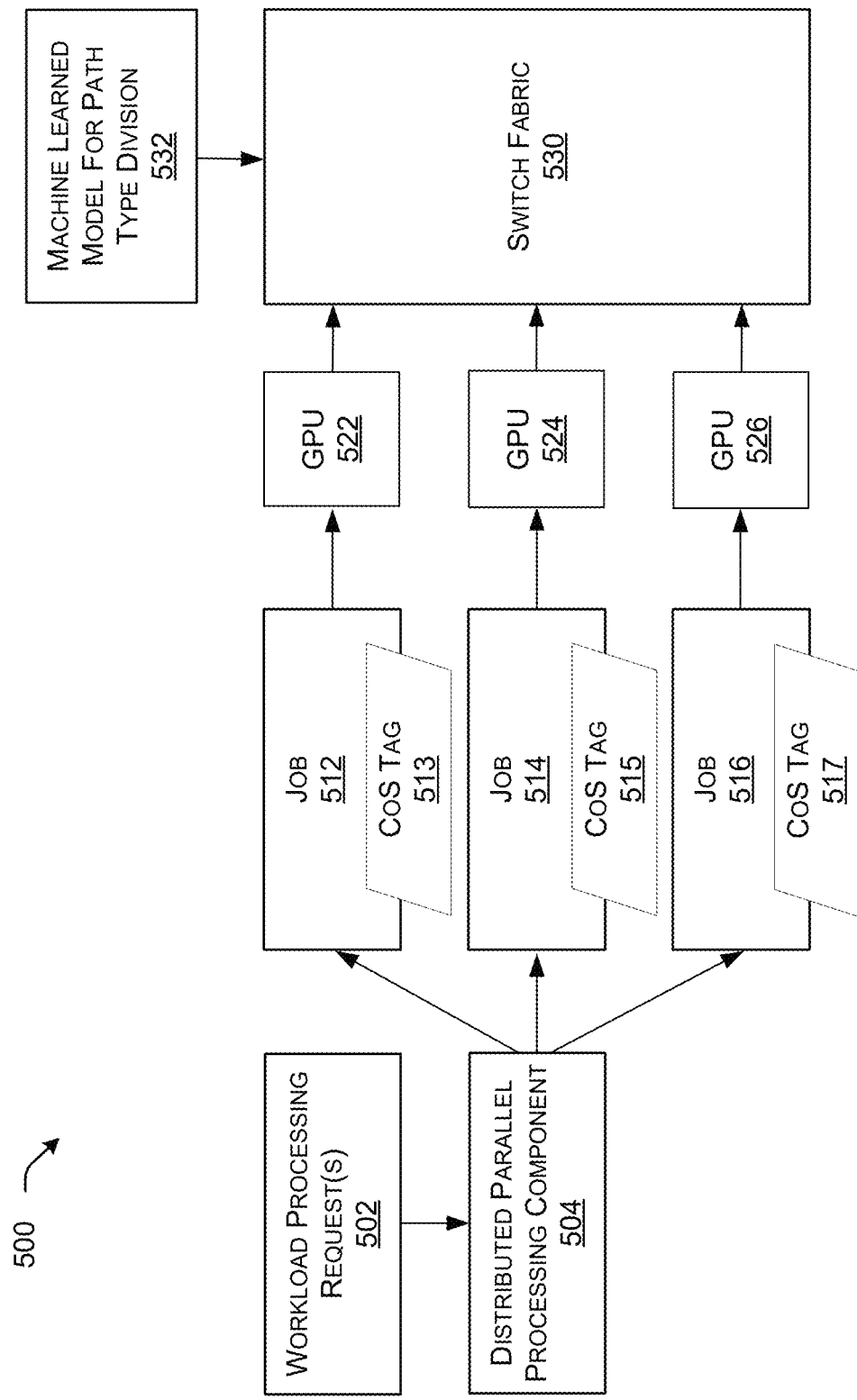
FIG. 5 illustrates an example hybrid load balancing system, in accordance with various aspects of the technologies disclosed herein.

FIG. 5 illustrates an example hybrid load balancing system 500, in accordance with various aspects of the technologies disclosed herein. The hybrid load balancing system 500 comprises a machine learned model for path type division 532 and a distributed parallel processing component 504. The distributed parallel processing component 504 is illustrated as receiving workload processing requests 502, and sending jobs to different GPUs, the jobs including job 512, job 514, and job 516. Each of the jobs is also assigned a class of service (CoS) tag. Job 512 is assigned CoS tag 513, job 514 is assigned CoS tag 515, and job 516 is assigned CoS tag 517. The GPUs include GPU 522, GPU 524, and GPU 526. Each of the GPUs is connected to a switch fabric 530 which can transport synchronization data between the GPUs. Proportions of different path types, for load balancing purposes, can be set by the machine learned model for path type division 532. In some embodiments, the distributed parallel processing component 504 can be deployed in a front end network and the GPUs and the switch fabric 530 can be deployed in a back end network.

In example operations according to FIG. 5, the machine learned model for path type division 532 can process, e.g., inputs such as incoming workload information, telemetry measurements, and switch fabric 530 performance measurements. The machine learned model for path type division 532 can output a number or percentage of switch fabric 530 paths to be load balanced using telemetry assisted load balancing, and/or a number or percentage of switch fabric 530 paths to be load balanced using packet spraying type load balancing. The machine learned model for path type division 532 can output the number or percentage to the switch fabric 530, causing the switch fabric 530 to configure itself according to the output of the machine learned model for path type division 532.

The distributed parallel processing component 504 can process workload processing request(s) 502, optionally along with switch fabric 530 telemetry measurements to generate CoS tags 513, 515, 517 for application to the jobs 512, 514, 516. The jobs 512, 514, 516 can comprise distinct workloads, or slices of a workload. The CoS tags 513, 515, 517 can provide information such as a priority level (high, medium, or low) of a job, an indication of which type of load balancing (telemetry assisted or packet spraying) to apply synchronization data resulting from a job, and/or an indication of a specific path to use for synchronization data resulting from a job.

The GPUs 522, 524, 526 can be configured to process the respective jobs 512, 514, 516 assigned thereto, resulting in synchronization data to be sent to the other GPUs. The GPUs 522, 524, 526 can send the synchronization data to the other GPUs along paths through the switch fabric 530 which are determined based on the CoS tags 513, 515, 517. For example, higher priority synchronization data can be sent along a telemetry assisted path, while medium or lower priority synchronization data can be sent along packet spraying paths. Synchronization data that is flagged for either telemetry assisted paths or packet spraying paths can be sent along paths for which they are flagged. Synchronization data that is designated to be sent along a particular specified path or paths can be sent along the specified path or paths and can be directed exclusively at the designated path or packet sprayed across multiple paths as appropriate for the path type.

Figure 6:
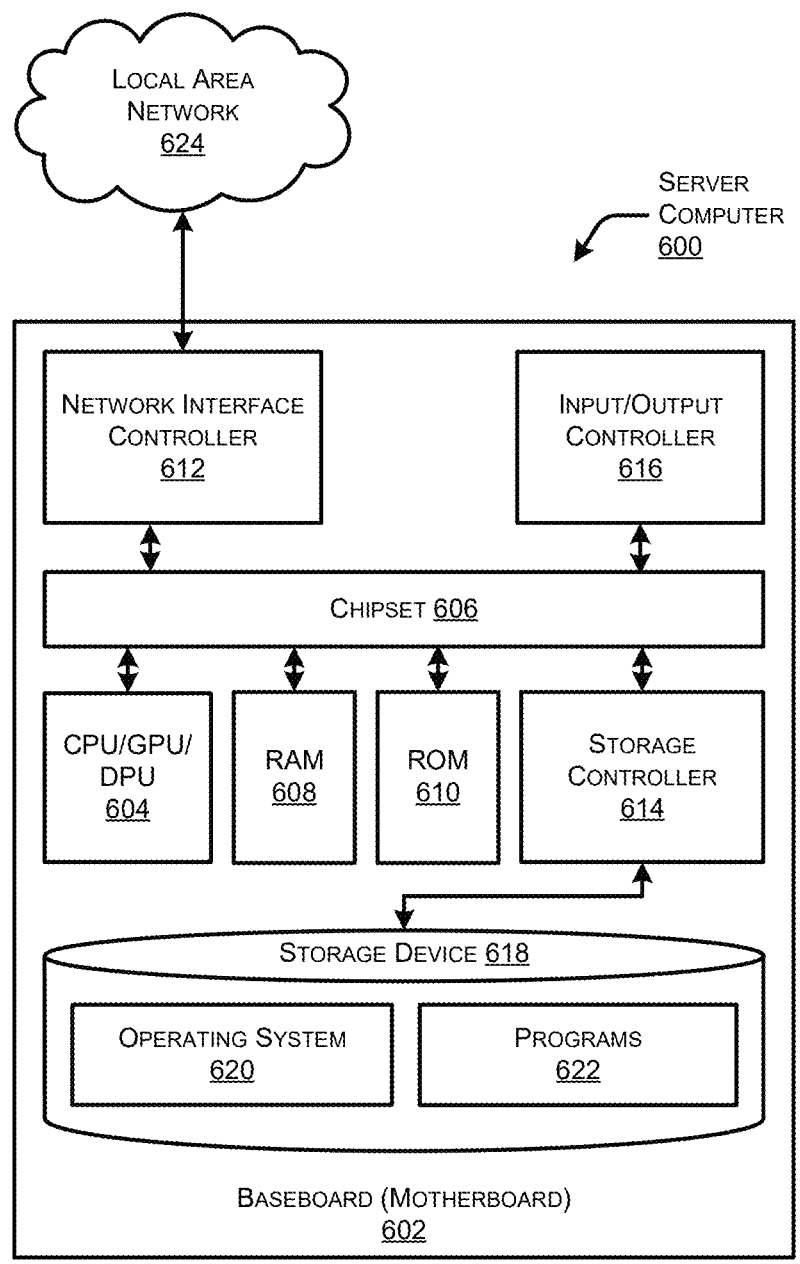
FIG. 6 illustrates an example computer hardware architecture that can implement devices in accordance with various aspects of the technologies disclosed herein.

FIG. 6 illustrates an example computer hardware architecture that can implement devices in accordance with various aspects of the technologies disclosed herein. The computer architecture shown in FIG. 6 illustrates a conventional server computer 600, however the computer architecture can optionally implement any other computing devices such as a router, a workstation, desktop computer, laptop, tablet, network appliance, e-reader, smartphone, or other computing device. The illustrated computer architecture can be utilized to execute any of the software components presented herein.

The server computer 600 includes a baseboard 602, or "motherboard," which is a printed circuit board to which a multitude of components or devices can be connected by way of a system bus or other electrical communication paths. In one illustrative configuration, one or more central processing units ("CPUs"), graphics processing units ("GPUs"), or data processing units ("DPUs") 604 operate in conjunction with a chipset 606. The CPU/GPU/DPU 604 can comprise one or more standard programmable processors that perform arithmetic and logical operations necessary for the operation of the server computer 600.

The CPU/GPU/DPU 604 can perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 606 provides an interface between the CPU/GPU/DPU 604 and the remainder of the components and devices on the baseboard 602. The chipset 606 can provide an interface to a RAM 608, used as the main memory in the server computer 600. The chipset 606 can further provide an interface to a computer-readable storage medium such as a read-only memory ("ROM") 610 or non-volatile RAM ("NVRAM") for storing basic routines that help to start up the server computer 600 and to transfer information between the various components and devices. The ROM 610 or NVRAM can also store other software components necessary for the operation of the server computer 600 in accordance with the configurations described herein.

The server computer 600 can operate in a networked environment using logical connections to remote computing devices and computer systems through a network, such as the LAN 624. The chipset 606 can include functionality for providing network connectivity through a NIC 612, such as a gigabit Ethernet adapter. The NIC 612 is capable of connecting the server computer 600 to other computing devices over the LAN 624. It should be appreciated that multiple NICs 612 can be present in the server computer 600, connecting the computer to other types of networks and remote computer systems.

The server computer 600 can be connected to a storage device 618 that provides non-volatile storage for the server computer 600. The storage device 618 can store an operating system 620, programs 622, and data, to implement any of the various components described in detail herein.

The storage device 618 can be connected to the server computer 600 through a storage controller 614 connected to the chipset 606. The storage device 618 can comprise one or more physical storage units. The storage controller 614 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The server computer 600 can store data on the storage device 618 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 618 is characterized as primary or secondary storage, and the like.

For example, the server computer 600 can store information to the storage device 618 by issuing instructions through the storage controller 614 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The server computer 600 can further read information from the storage device 618 by detecting the physical states or characteristics of one or more particular locations within the physical storage units.

In addition to the mass storage device 618 described above, the server computer 600 can have access to other computer-readable storage media to store and retrieve information, such as program modules, data structures, or other data. It should be appreciated by those skilled in the art that computer-readable storage media is any available media that provides for the non-transitory storage of data and that can be accessed by the server computer 600. In some examples, the operations performed by the computing elements illustrated in FIGS. 1-3, and or any components included therein, may be supported by one or more devices similar to server computer 600.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 618 can store an operating system 620 utilized to control the operation of the server computer 600. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage device 618 can store other system or application programs and data utilized by the server computer 600.

In one embodiment, the storage device 618 or other computer-readable storage media is encoded with computer-executable instructions which, when loaded into the server computer 600, transform the computer from a general-purpose computing system into a special-purpose computer capable of implementing the embodiments described herein. These computer-executable instructions transform the server computer 600 by specifying how the CPU/GPU/DPU 604 transitions between states, as described above.

According to one embodiment, the server computer 600 has access to computer-readable storage media storing computer-executable instructions which, when executed by the server computer 600, can implement the architectures and perform the various processes described with regard to FIGS. 1-5 and FIGS. 7-8. The server computer 600 can also include computer-readable storage media having instructions stored thereupon for performing any of the other computer-implemented operations described herein.

The server computer 600 can also include one or more input/output controllers 616 for receiving and processing input from a number of input devices, such as a keyboard, a mouse, a touchpad, a touch screen, an electronic stylus, or other type of input device. Similarly, an input/output controller 616 can provide output to a display, such as a computer monitor, a flat panel display, a digital projector, a printer, or other type of output device. It will be appreciated that the server computer 600 might not include all of the components shown in FIG. 6, can include other components that are not explicitly shown in FIG. 6, or might utilize an architecture completely different than that shown in FIG. 6.

Figure 7:
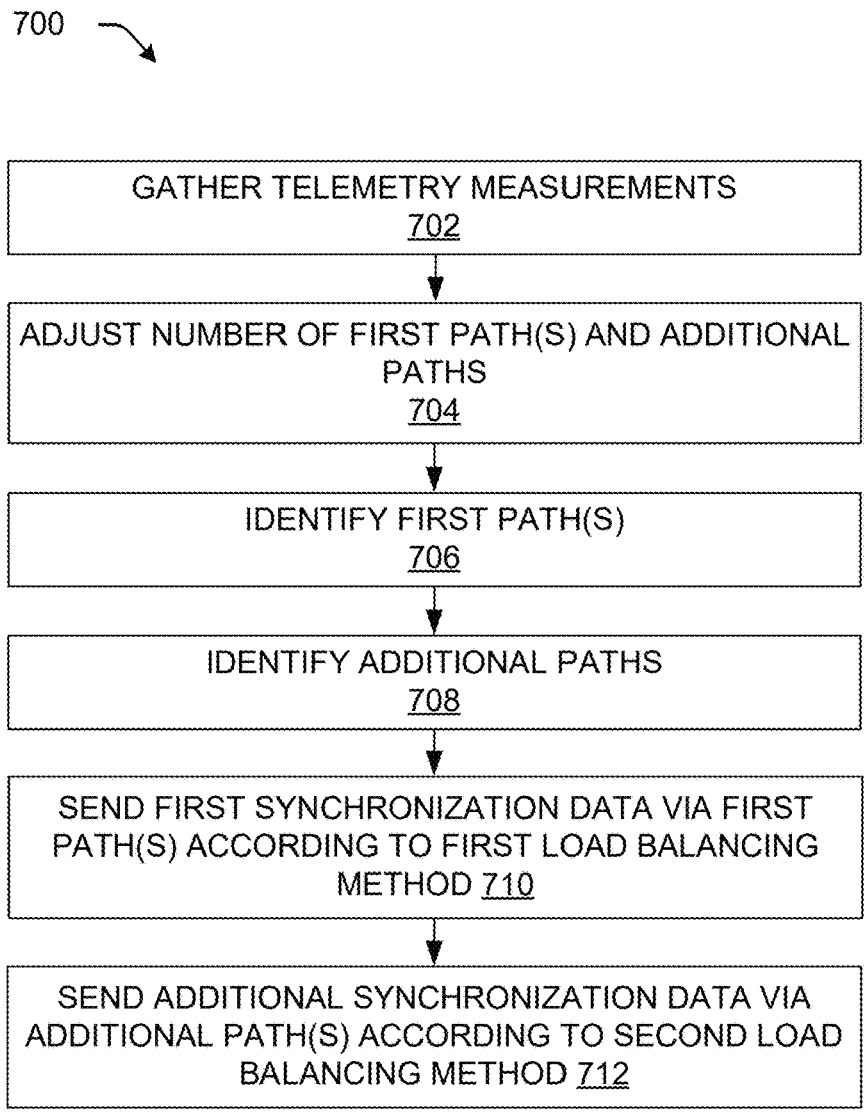
FIG. 7 is a flow diagram that illustrates an example switch fabric load balancing method, in accordance with various aspects of the technologies disclosed herein.
Figure 8:
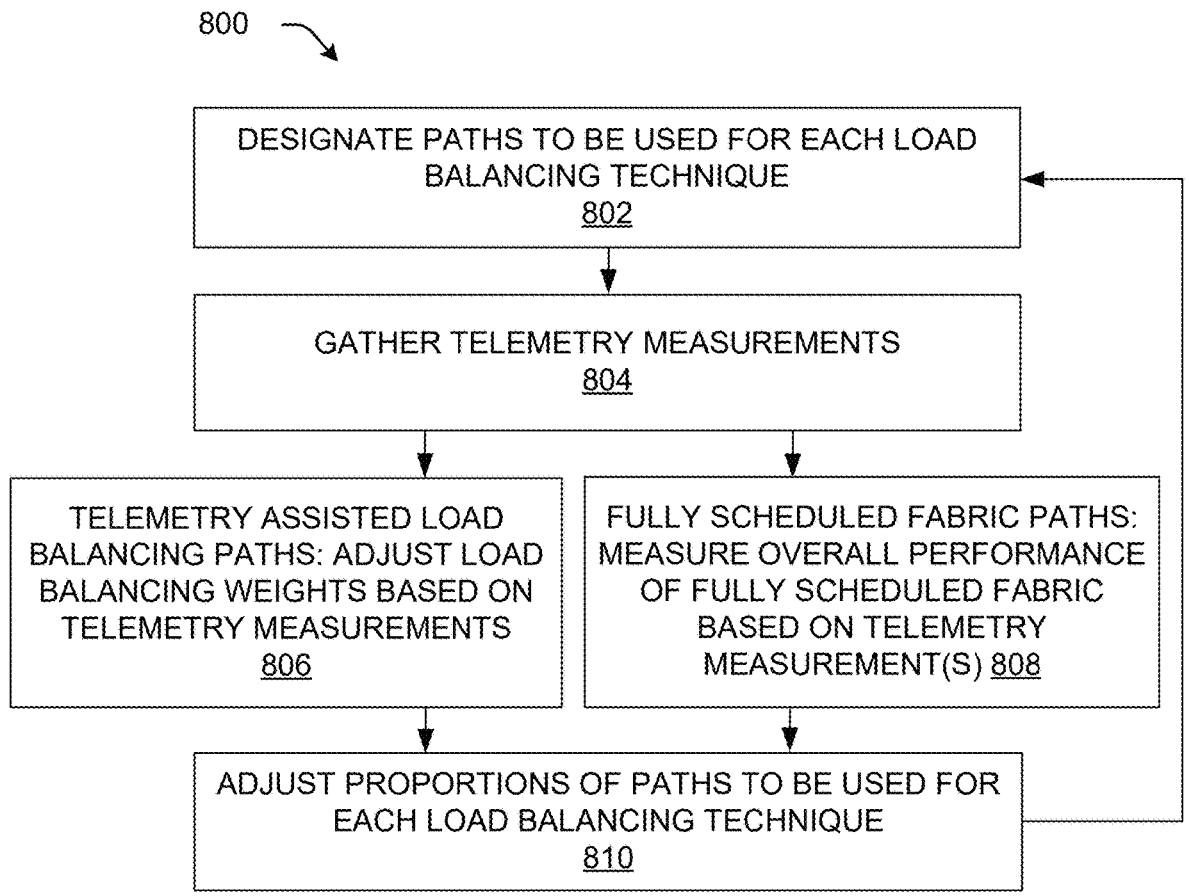
FIG. 8 is a flow diagram that illustrates an example process for adjusting proportions of paths to be used in connection with different load balancing techniques, in accordance with various aspects of the technologies disclosed herein.

FIGS. 7-8 are a flow diagrams of example methods 700, 800 performed at least partly by a computing device, such as the server computer 600, optionally in conjunction with other computing devices. The logical operations described herein with respect to FIGS. 7-8 may be implemented (1) as a sequence of computer-implemented acts or program modules running on a computing system and/or (2) as interconnected machine logic circuits or circuit modules within the computing system. In some examples, the methods 700, 800 may be performed by a system comprising one or more processors and one or more non-transitory computer-readable media storing computer-executable instructions that, when executed by the one or more processors, cause the one or more processors to perform the methods 700, 800.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof.

It should also be appreciated that more or fewer operations might be performed than shown in FIGS. 7-8 and described herein. These operations can also be performed in parallel, or in a different order than those described herein. Some or all of these operations can also be performed by components other than those specifically identified. Although the techniques described in this disclosure are with reference to specific components, in other examples, the techniques may be implemented by fewer components, more components, different components, or any configuration of components.

FIG. 7 is a flow diagram that illustrates an example switch fabric load balancing method, in accordance with various aspects of the technologies disclosed herein. In an example embodiment, the illustrated method can be performed by a load balancer such as load balancer 210, introduced in FIG. 2. The load balancer 210 balances loads on paths through a switch fabric 220 which enables communication of synchronization data between multiple processors, e.g., the multiple GPUs included in the cluster 260. The synchronization data can comprise, e.g., machine learning model training data which results from multiple GPUs cooperating to train a machine learning model, or an output of any other HPC computing process which is preferably synchronized across processors.

At operation 702, the load balancer 210 can gather telemetry measurements. Gathering telemetry measurements can comprise sending, e.g., by telemetry agents 320, a plurality of telemetry packets 330 via multiple paths through a switch fabric 220 and measuring travel times of the telemetry packets 330 in order to evaluate speeds of the multiple paths. The travel times can be reported as measurements 310 and received at the load balancer 210.

At operation 704, the load balancer 210 can adjust a number of first paths and corresponding second/additional paths. For example, in a switch fabric comprising one hundred (100) paths, the load balancer 210 may designate a first number, e.g., 15 first paths, and a corresponding second number, e.g., 85 second paths. Alternatively, the load balancer 210 may designate, e.g., 25% of paths to be used as first paths and 75% of paths to be used as second/additional paths. The load balancer 210 can use workload characteristics, the telemetry measurements 310, and/or performance measurements associated with the switch fabric 220 to adjust the number of first paths and corresponding second/additional paths.

At operation 706, the load balancer 210 can identify first path(s) through the switch fabric 220, wherein the first path(s) can comprise first switch usage sequences of multiple switches included in the switch fabric 220. The multiple switches can be implemented by the ingress leaves 230, spines 240, and egress leaves, and a usage sequence of multiple switches can comprise, e.g., ingress leaf 231 to spine 241 to egress leaf 251, which is one of the example first paths 430 illustrated in FIG. 4. The first path(s) identified at operation 706 can include one or multiple first paths.

At operation 708, the load balancer 210 can identify two or more second/additional paths through the switch fabric 220. Each of the two or more additional paths can comprise a respective different switch usage sequence of the multiple switches in the switch fabric 220. For example, the usage sequence of ingress leaf 232, spine 242, egress leaf 252 (illustrated in FIG. 4 as one of the second paths 440) is different from the usage sequence of ingress leaf 233, spine 243, egress leaf 253 (illustrated in FIG. 4 as another of the second paths 440). The two or more additional paths can comprise remaining paths other than the first path(s) identified at operation 706.

In some examples, identifying the first path(s) at operation 706 and identifying the two or more second/additional paths at operation 708 can be based on telemetry measurements 310 and as such can comprise sending a plurality of telemetry packets via multiple paths through the switch fabric 220 and measuring travel times of the telemetry packets in order to evaluate speeds of the multiple paths. The first path(s) can comprise those paths associated with faster telemetry packet speeds than one or more other telemetry packet speeds associated with one or more other paths of the multiple paths, and the second path(s) can comprise those paths associated with slower telemetry packet speeds than one or more other telemetry packet speeds, e.g., slower than the speeds across the first path(s).

At operation 710, the load balancer 210 can send first synchronization data via the first path(s) identified at operation 706, according to a first load balancing method. For example, the load balancer 210 can use a load balancing technique, such as telemetry assisted load balancing, to assign each of multiple first synchronization data to a respective one of the first path(s) identified at operation 706. GPUs can output their synchronization data to the first path to which the synchronization data is assigned. The load balancer 210 can optionally assign higher priority synchronization data to the first path(s), and lower priority synchronization data to the second/additional paths.

At operation 712, the load balancer 210 can send second/additional synchronization data via the two or more additional paths identified at operation 708, according to a second load balancing method. In an example, packet spraying can be the load balancing technique applied to the two or more additional paths. The load balancer 210 can use a packet spraying technique to distribute the second synchronization data among the two or more additional paths.

FIG. 8 is a flow diagram that illustrates an example process for adjusting proportions of paths to be used in connection with different load balancing techniques, in accordance with various aspects of the technologies disclosed herein. In an example embodiment, the illustrated method can be performed by a load balancer such as load balancer 210, introduced in FIG. 2. The load balancer 210 balances loads on paths through a switch fabric 220 which enables communication of synchronization data between multiple processors, e.g., the multiple GPUs included in the cluster 260. The synchronization data can comprise, e.g., machine learning model training data which results from multiple GPUs cooperating to train a machine learning model, or an output of any other HPC computing process which is preferably synchronized across processors.

At operation 802, the load balancer 210 can designate paths to be used for each load balancing technique. For example, a first portion of the overall paths may be designated for weighted load balancing, and a second portion may be designated for packet spraying. The portions may be defined for example as percentages, numbers of links/paths, or by overall bandwidth amount.

At operation 804, the load balancer 210 can gather telemetry measurements. For example, micro-transactions can be sent from every processing unit to every other processing unit (such as every GPU 261, 262, 263 to every other GPU 261, 262, 263), and path measurements can be collected, as described herein.

At operation 806, for telemetry assisted load balancing paths (designated at operation 802) the load balancer 210 can adjust load balancing weights based on the telemetry measurements gathered at operation 804. For example, results from micro-transactions can be used to determine changes to load balancing weights for each path. One or more of the paths may optionally be dedicated to specific transactions, e.g., to the transport of synchronization data that is output by a designated GPU.

At operation 808, for packet spraying paths (designated at operation 802), results from the micro-transactions of operation 804 can be used to determine overall performance across the packet sprayed portion of the switch fabric 220. In some embodiments, a single telemetry measurement can be made for the entire packet sprayed portion of the switch fabric 220, and the resulting measurement data can be used to understand performance of the packet sprayed portion of the switch fabric 220, e.g., for use at operation 810.

At operation 810, the load balancer 210 can adjust proportions of paths to be used for each load balancing technique. For example, overall measurements can be used to determine if the proportion of weighted versus sprayed paths should be redistributed. AI/ML can be applied to help adjust to an optimal distribution of load balancing types, e.g., a distribution that will optimize the telemetry measurements gathered in subsequent iterations of operations 804. An output from operation 810 can be fed back to operation 802 so that that paths can be redesignated according to adjusted proportions determined at operation 810.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method, comprising:
   identifying a first path through a switch fabric comprising multiple switches, wherein the first path comprises a first switch usage sequence of the multiple switches;
   identifying two or more additional paths through the switch fabric, wherein each of the two or more additional paths comprises a respective different switch usage sequence of the multiple switches;
   wherein the switch fabric enables communication of synchronization data between multiple processors;
   sending first synchronization data of the synchronization data via the first path according to a telemetry assisted load balancing technique; and
   sending second synchronization data of the synchronization data via the two or more additional paths, wherein sending the second synchronization data is distributed among the two or more additional paths according to a packet spraying load balancing technique.

2. The method of claim 1, wherein identifying the first path comprises sending a plurality of telemetry packets via multiple paths through the switch fabric and measuring travel times of the telemetry packets in order to evaluate speeds of the multiple paths.

3. The method of claim 2, wherein the first path is associated with a faster telemetry packet speed than one or more other telemetry packet speeds associated with one or more other paths of the multiple paths.

4. The method of claim 3, wherein the first synchronization data is associated with a higher priority than the second synchronization data.

5. The method of claim 1, wherein identifying the first path comprises identifying multiple first paths and using the telemetry assisted load balancing technique to assign each of multiple first synchronization data to one or more of the multiple first paths.

6. The method of claim 5, further comprising adjusting a number of the multiple first paths in response to at least one performance measurement associated with the switch fabric.

7. The method of claim 6, wherein a machine learned model is used to adjust the number of the multiple first paths.

8. The method of claim 1, wherein the two or more additional paths comprise remaining paths other than the first path.

9. The method of claim 1, wherein the multiple processors comprise graphics processing units (GPUs).

10. The method of claim 1, wherein at least one of the first synchronization data or the second synchronization data comprises machine learning model training data.

11. A device comprising:
    one or more processors; and
    one or more non-transitory computer-readable media storing computer-executable instructions that, when executed by the one or more processors, cause the one or more processors to perform operations comprising:
    identifying a first path through a switch fabric comprising multiple switches, wherein the first path comprises a first switch usage sequence of the multiple switches;
    identifying two or more additional paths through the switch fabric, wherein each of the two or more additional paths comprises a respective different switch usage sequence of the multiple switches;
    wherein the switch fabric enables communication of synchronization data between multiple processors;
    sending first synchronization data of the synchronization data via the first path according to a telemetry assisted load balancing technique; and
    sending second synchronization data of the synchronization data via the two or more additional paths, wherein sending the second synchronization data is distributed among the two or more additional paths according to a packet spraying load balancing technique.

12. The device of claim 11, wherein identifying the first path comprises sending a plurality of telemetry packets via multiple paths through the switch fabric and measuring travel times of the telemetry packets in order to evaluate speeds of the multiple paths.

13. The device of claim 12, wherein the first path is associated with a faster telemetry packet speed than one or more other telemetry packet speeds associated with one or more other paths of the multiple paths.

14. The device of claim 13, wherein the first synchronization data is associated with a higher priority than the second synchronization data.

15. The device of claim 11, wherein identifying the first path comprises identifying multiple first paths and using a load balancing technique to assign each of multiple first synchronization data to a respective one of the multiple first paths.

16. The device of claim 15, further comprising adjusting a number of the multiple first paths in response to at least one performance measurement associated with the switch fabric.

17. The device of claim 16, wherein a machine learned model is used to adjust the number of the multiple first paths.

18. A method comprising:
- identifying multiple first paths through a switch fabric, wherein each of the multiple first paths comprises a respective switch usage sequence of switches of a switch fabric;
- identifying two or more additional paths through the switch fabric, wherein each of the two or more additional paths comprises a respective different switch usage sequence of the switches of the switch fabric;
- sending each of multiple first synchronization data among a plurality of processors via one or more of the multiple first paths according to a telemetry assisted load balancing technique; and
- sending each of multiple second synchronization data among the plurality of processors via the two or more additional paths, wherein sending each of the multiple second synchronization data is shared among the two or more additional paths according to a packet spraying load balancing technique.

19. The method of claim 18, wherein identifying the multiple first paths comprises sending telemetry packets via a plurality of paths through the switch fabric and measuring travel times of the telemetry packets in order to evaluate speeds of the plurality of paths, and wherein the multiple first paths have faster speeds than one or more other paths of the plurality of paths.

20. The method of claim 18, further comprising adjusting a number of the multiple first paths in response to at least one performance measurement associated with the switch fabric.

* * * * *